United States Patent
Phelps et al.

(10) Patent No.: US 8,808,546 B2
(45) Date of Patent: Aug. 19, 2014

(54) HYDROCARBON REMOVAL FROM GAS PROCESS FEED STREAMS BY REGENERABLE FILTERS

(75) Inventors: Daniel W. Phelps, League City, TX (US); Luis Eduardo Caires Fernandez, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 109 days.

(21) Appl. No.: 13/593,749

(22) Filed: Aug. 24, 2012

(65) Prior Publication Data

US 2014/0053730 A1    Feb. 27, 2014

(51) Int. Cl.
*C07C 29/76* (2006.01)
*B01D 15/00* (2006.01)

(52) U.S. Cl.
USPC ........... 210/664; 210/673; 210/677; 210/690; 585/820; 585/826

(58) Field of Classification Search
USPC ........... 95/188, 231, 235, 236; 423/228–229; 210/660, 663, 664, 670, 671, 673, 677, 210/690, 691, 502.1; 585/820, 826; 568/621, 872
See application file for complete search history.

(56) References Cited

U.S. PATENT DOCUMENTS

| | | | |
|---|---|---|---|
| 3,306,841 A | 2/1967 | Ward | |
| 4,518,396 A * | 5/1985 | Rawson | 48/127.3 |
| 5,026,482 A * | 6/1991 | Sircar | 210/674 |
| 5,294,305 A * | 3/1994 | Craft et al. | 203/28 |
| 5,393,505 A * | 2/1995 | Audeh | 423/228 |
| 5,607,594 A * | 3/1997 | Pohl et al. | 210/662 |
| 5,707,528 A * | 1/1998 | Berry | 210/663 |
| 5,846,503 A * | 12/1998 | Yan | 423/228 |
| 6,245,128 B1 * | 6/2001 | George, Jr. | 95/186 |
| 6,416,670 B1 * | 7/2002 | Cummings | 210/673 |
| 6,563,010 B1 * | 5/2003 | Liepa | 568/917 |
| 6,764,602 B2 * | 7/2004 | Shutt et al. | 210/663 |
| 2006/0204419 A1 | 9/2006 | Thomas et al. | |

* cited by examiner

*Primary Examiner* — Frank Lawrence
(74) *Attorney, Agent, or Firm* — Gable Gotwals

(57) ABSTRACT

A system and process for removing hydrocarbons from a gas process feed stream is presented. The treatment process may be, but is not limited to, glycol dehydration, amine sweetening, and MEG reclamation. As an example, a hydrocarbon removal bed containing a solid adsorbent material adsorbs the hydrocarbons in a rich MEG feed stream as it passes through the hydrocarbon removal bed. After the hydrocarbons have been removed, the feed stream flows through a flash separator and a distillation column to reclaim MEG. Alternatively, the hydrocarbon removal bed may be used after the MEG reclamation process to remove hydrocarbons in the distilled water from the distillation column. Spent solid adsorbent material may be regenerated in place.

11 Claims, 2 Drawing Sheets

HYDROCARBON REMOVAL FROM GAS PROCESS FEED STREAMS BY REGENERABLE FILTERS

BACKGROUND

In many gas production environments, there are often heavier hydrocarbon compounds such as gas liquids, condensate, or even oils produced with the gas. In gas processing applications that remove contaminants from the gas stream, such as glycol dehydration, amine sweetening, or MEG reclamation, these heavier hydrocarbons often contaminate the process by becoming dissolved or suspended in the process fluids. In the oil and gas industry, triethylene glycol (TEG) is commonly used for gas drying, amine systems are commonly used for gas sweetening (hydrogen sulfide or carbon monoxide removal), and monoethylene glycol (MEG) is commonly used to prevent the formation of gas hydrates in pipelines. Hydrocarbon compounds require removal from each type of process because of the deleterious effects on the process. Although detailed descriptions are provided for MEG reclamation, the hydrocarbon removal process is similar for each gas processing application.

MEG is injected at the wellhead and readily mixes with the produced water to form a mixture referred to as rich MEG. The oil and rich MEG are separated in the final production separator. However, depending upon the properties of the oil, the hydrocarbon content of the rich MEG may be as high as 1,000 parts per million (ppm). When the oil properties are in the range of a light condensate, the hydrocarbon content may range from 100 ppm to 200 ppm, but even these concentrations may be excessive for optimal operation of the MEG reclamation process.

Standard gravity/time based process separation is the present technology for separating hydrocarbons from the rich MEG feed stream. The feed stream is commonly heated to 100° F. to 150° F. to facilitate this separation. Additional separation or particulate filtration may also be used to clean the rich MEG feed stream before it enters the reclamation process. Such filtration can be moderately successful depending on the design of the valves, piping, and vessel internals. However, it is still uncommon for these additional steps to reduce the hydrocarbon levels below 200 ppm.

Increasing the removal of hydrocarbons from the rich MEG improves the operation of the MEG reclamation process. In addition, hydrocarbons that are not removed from the rich MEG before the reclamation process begins can cause difficulties during the process. As an example, the MEG is heated in a heat exchanger and remains hot in the flash separator vessel. Under certain conditions, the heating process may convert some of the hydrocarbons to a black solid coke-like material that remains in suspension inside the flash separator. As more of this material forms, it increases the rich MEG's tendency to form a stable foam, reduces the settling of salt crystals, increases the abrasive nature of the rich MEG so that pump seal failure and pipe erosion are more prevalent, and discolors the salt produced in the reclamation process making it unsuitable for marine discharge. In offshore operations, excessive hydrocarbon levels in the rich MEG feed stream can carry through the MEG reclamation process to the lean MEG and cause plugging of the downstream lean MEG injection nozzles if the hydrocarbons form a solid compound under line or injection conditions.

In addition, hydrocarbons carried with the rich MEG feed stream into the MEG reclamation process must either remain in the flash separator or flash to the distillation column. The light hydrocarbons that flash to the distillation column exit with the distilled water, while the heavy hydrocarbons that flash to the distillation column must exit with the lean MEG. In either case, the hydrocarbons may need to be removed to meet water discharge or product purity specifications.

Hydrocarbon removal beyond the final production separator is currently limited. Activated charcoal filters are generally used for such removal and are capable of reducing the hydrocarbon levels to the range of approximately 25 to 50 ppm. However, because activated charcoal filters are not very efficient, they are heavy and require large amounts of space and volume. This additional space and weight is very expensive, particularly for offshore operations. In addition, the charcoal filter material must be replaced whenever it is fully adsorbed with hydrocarbons. The spent material may be disposed of as waste or regenerated onshore. Periodically replacing the filter material and properly handling the spent material further increase the costs associated with activated charcoal filters.

A need exists for removing hydrocarbons from rich MEG and other gas process feed streams in order to improve the efficiency and eliminate problems during the treatment process. A need also exists for removing hydrocarbons from distilled water that is produced as a by-product of the MEG reclamation process. A need also exists for a hydrocarbon removal bed that is smaller and lighter than the charcoal filters that are currently used and that can be regenerated without removing and processing the adsorbent material.

SUMMARY OF THE INVENTION

A system for removing hydrocarbons from a gas process feed stream is presented. The system includes a hydrocarbon removal bed containing a solid adsorbent material that adsorbs the hydrocarbons in the process stream as it flows through the hydrocarbon removal bed. The spent solid adsorbent material may be regenerated without removing it from the hydrocarbon removal bed.

A process for removing hydrocarbons from a gas process feed stream or distilled water is also presented. The process includes the steps of providing a hydrocarbon removal bed containing a solid adsorbent material and passing the process stream through the hydrocarbon removal bed so that the hydrocarbons are adsorbed to the material. A regeneration fluid, which may be water produced during the MEG reclamation process, is used to regenerate the spent solid adsorbent material without removing it from the hydrocarbon removal bed.

Objects of this invention are to (1) provide a more efficient process to remove hydrocarbon contained in a gas process feed stream; (2) eliminate the need for charcoal filters to reduce hydrocarbon content in the stream; (3) reduce the volume and footprint of the processing equipment typically required to remove or reduce hydrocarbon content in the stream; and (4) provide a renewable or reusable bed for hydrocarbon removal.

ELEMENTS AND NUMBERING USED IN THE DRAWINGS AND THE DETAILED DESCRIPTION

Figure 1:
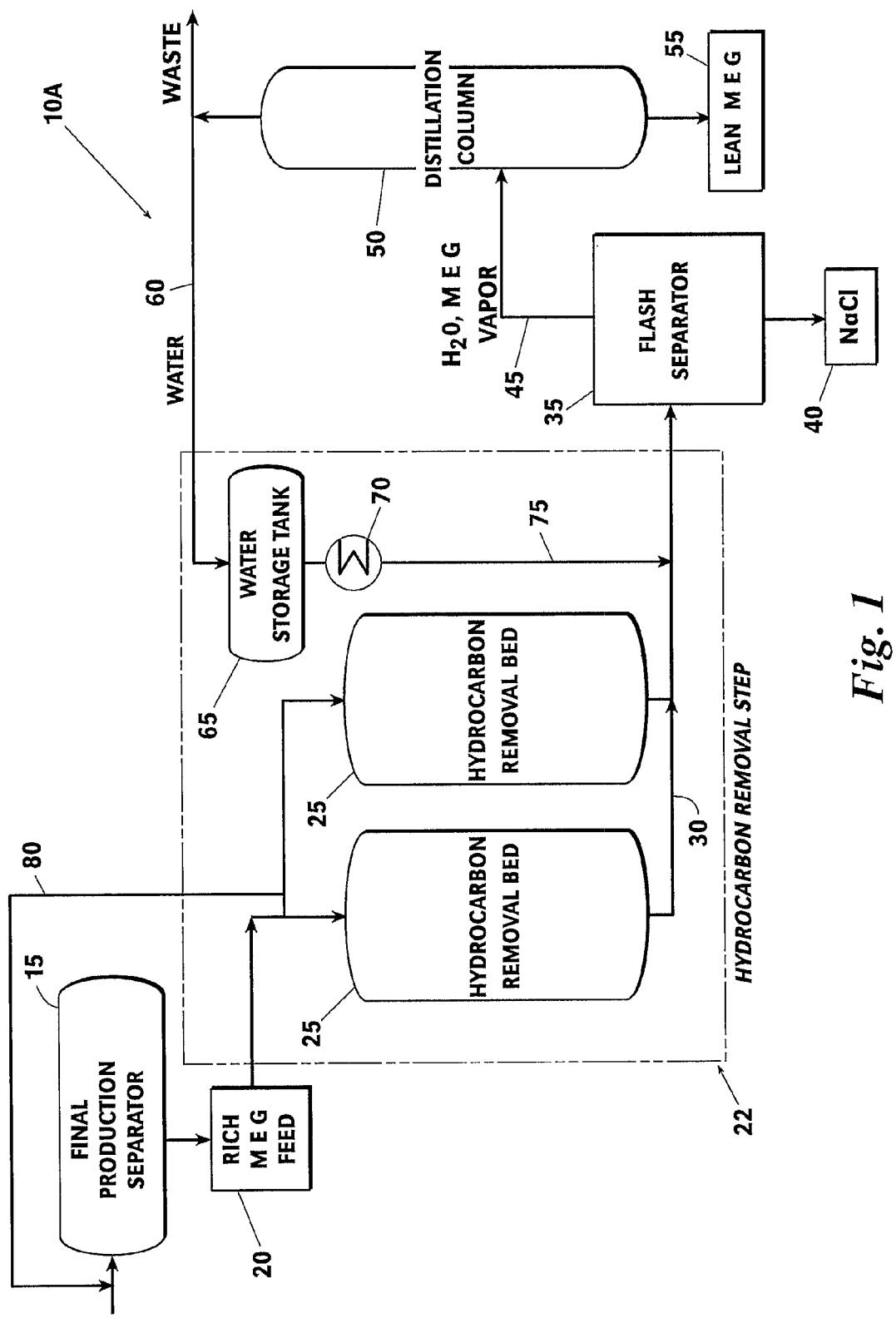
FIG. 1 shows an embodiment of a process for removing hydrocarbons from a rich MEG feed stream as part of a MEG reclamation process, practiced according to this invention.

10 Hydrocarbon removal process
15 Final production separator
20 Rich MEG feed stream
22 Hydrocarbon removal step
25 Hydrocarbon removal bed
30 Rich MEG stream with majority of hydrocarbons removed
35 Flash separator
40 Sodium chloride waste stream
45 Vaporized water and MEG stream
50 Distillation column
55 Lean MEG
60 Distilled water
65 Water storage tank
70 Heat exchanger
75 Heated distilled water stream
80 Combined distilled water and hydrocarbon stream
85 Distilled water with majority of hydrocarbons removed
90 Clean water stream
95 Heated clean water stream
100 Combined clean water and hydrocarbon stream

DETAILED DESCRIPTION OF THE PREFERRED EMBODIMENTS

As shown in FIG. 1, a regenerable hydrocarbon adsorbent material may be used to adsorb the hydrocarbons from the rich MEG feed stream. Suitable adsorbent materials include, but are not limited to, DOWEX OPTIPORE (Dow Chemical Co., Midland, Mich.). A preferred embodiment of a hydrocarbon removal process 10A practiced according to this invention begins with the final production separator 15, which produces a mixture of produced water and MEG commonly referred to as rich MEG. The rich MEG feed stream 20 is routed to a hydrocarbon removal step 22 comprised of dual hydrocarbon removal beds 25 which contain solid adsorbent material and alternate between adsorption and regeneration phases. In the adsorption phase, hydrocarbons are selectively transferred from the rich MEG feed stream 20 to the surface of the solid adsorbent material. Although two hydrocarbon removal beds 25 are shown in FIG. 1, the step may use more than two beds or a single bed. The rich MEG stream with the majority of hydrocarbons removed 30 then exits the hydrocarbon removal beds 25 and flows to the MEG reclamation process. The MEG reclamation process begins in a flash separator 35, where the pressure is reduced in order to separate salts from the rich MEG and water. A sodium chloride waste stream 40 exits the bottom end of the flash separator 35, while the vaporized water and MEG stream 45 exits the top end and flows to the distillation column 50. The distillation column 50 uses partial condensation to separate the water and MEG components of the vaporized water and MEG stream 45. Lean MEG 55 exits the bottom end of the distillation column 50 and distilled water 60 is discharged from the top end of the distillation column 50. The distilled water 60 may be discharged as waste or recycled for use in the regeneration phase.

Regeneration of the hydrocarbon removal beds 25 may be accomplished with steam, hot MEG, or hot water. In the embodiment described in FIG. 1, distilled water 60 from the distillation column 50 is sent to a water storage tank 65. At the beginning of the regeneration process, one of the hydrocarbon removal beds 25 is taken off-line by diverting the flow of the rich MEG stream 20 from that bed 25 to the alternate bed 25. Distilled water 60 from the water storage tank 65 is then heated by a heat exchanger 70 to generate steam in the range of 100 to 200 pounds per square inch (psi). The heated distilled water stream 75 passes through the off-line hydrocarbon removal bed 25 in a direction opposite that of the flow of the rich MEG feed stream 20. Hydrocarbons that have been adsorbed to the solid adsorbent material inside the hydrocarbon removal bed 25 are transferred to the heated distilled water stream 75, and the combined distilled water and hydrocarbon stream 80 exits from the top of the hydrocarbon removal bed 25. The combined distilled water and hydrocarbon stream 80 is then recycled back into the final production separator 15.

Figure 2:
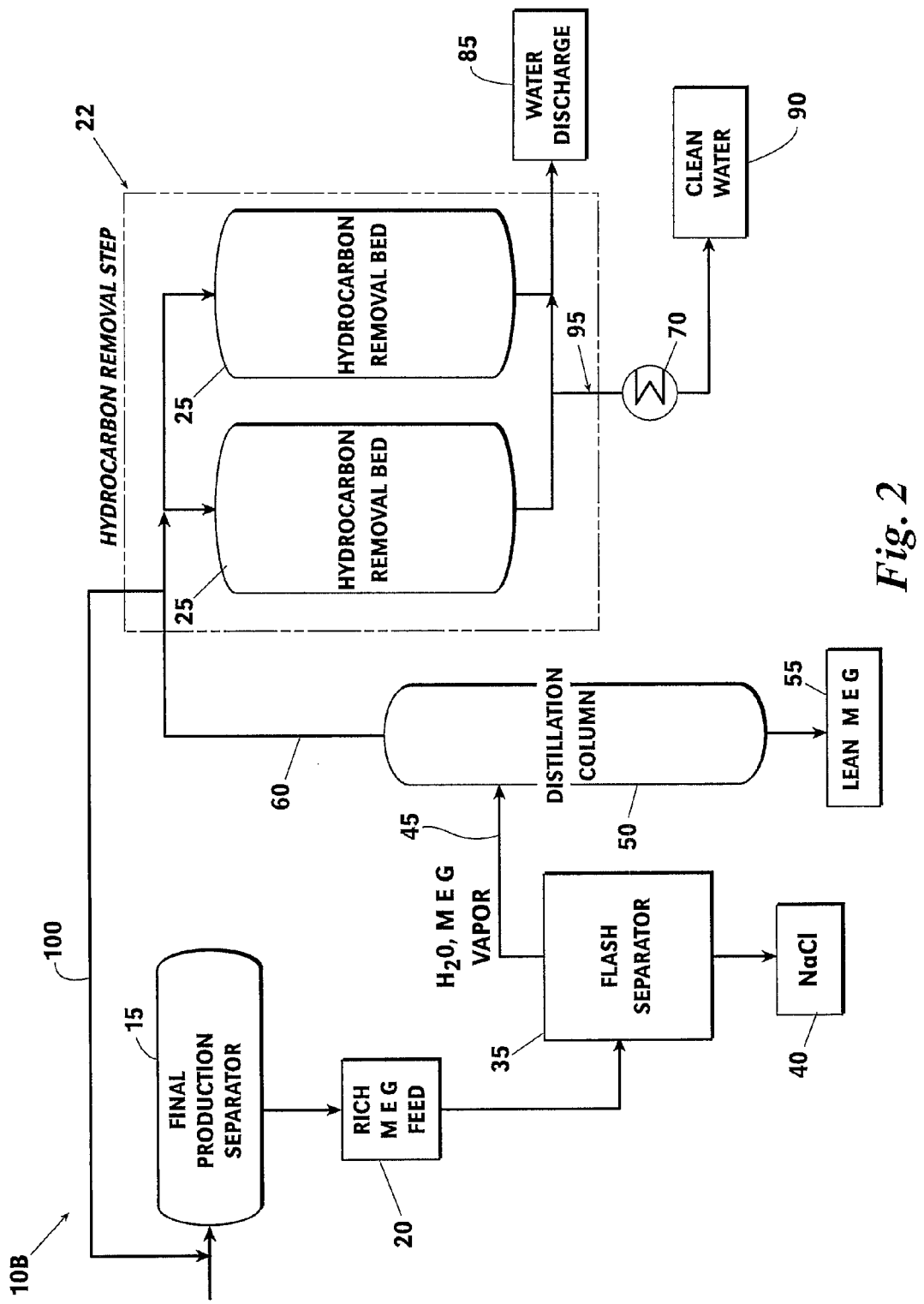
FIG. 2 presents an embodiment of a process for removing hydrocarbons from distilled water, practiced according to this invention.

As shown in FIG. 2, a regenerable hydrocarbon adsorbent material may be used to adsorb the hydrocarbons from the distilled water stream of the MEG reclamation process. A preferred embodiment of a hydrocarbon removal process 10B practiced according to this invention begins with the final production separator 15, which produces a mixture of produced water and MEG commonly referred to as rich MEG. The rich MEG feed stream 20 flows to a flash separator 35. A sodium chloride waste stream 40 exits the bottom end of the flash separator 35, while the vaporized water and MEG stream 45 exits the top end and flows to the distillation column 50. The distillation column 50 uses partial condensation to separate the water and MEG components of the vaporized water and MEG stream 45. Lean MEG 55 exits the bottom end of the distillation column 50 and distilled water 60 is discharged from the top end of the distillation column 50.

However, the distilled water 60 still contains all of the hydrocarbons with boiling points that are low enough to be flashed to vapor in the distillation column 50. The distilled water 60 is therefore routed to a hydrocarbon removal step 22 comprised of dual hydrocarbon removal beds 25 which contain solid adsorbent material and alternate between adsorption and regeneration phases. In the adsorption phase, hydrocarbons are selectively transferred from the distilled water 60 to the surface of the solid adsorbent material. Although two hydrocarbon removal beds 25 are shown in FIG. 2, the step may use more than two beds or a single bed. The distilled water with the majority of hydrocarbons removed 85 then exits the hydrocarbon removal beds 25. This water 85 may be used to regenerate the hydrocarbon removal beds 25, recycled into other processes, or discharged if it meets the appropriate requirements.

Regeneration of the hydrocarbon removal beds 25 may be accomplished with steam or hot water. In the embodiment described in FIG. 2, one of the hydrocarbon removal beds 25 is taken off-line by diverting the flow of distilled water 60 from that bed 25 to the alternate bed 25. A clean water stream 90 is then heated by a heat exchanger 70 to generate steam in the range of 100 to 200 psi and routed through the off-line hydrocarbon removal bed 25 in a direction opposite that of the distilled water 60 from the distillation column 50. Hydrocarbons that have been adsorbed to the solid adsorbent material inside the hydrocarbon removal beds 25 are flushed from the adsorbent material to the heated clean water stream 95, and the combined clean water and hydrocarbon stream 100 exits from the top of the hydrocarbon removal bed 25. The combined clean water and hydrocarbon stream 100 is then recycled back into the final production separator 15.

While preferred embodiments of a system and process for removing hydrocarbons from gas process feed streams have been described in detail, a person of ordinary skill in the art understands that certain changes can be made in the arrangement of process steps and type of components used in the system and process without departing from the scope of the following claims.

What is claimed is:

1. A system for removing hydrocarbons from a fluid feed stream, the system comprising:
a hydrocarbon removal bed, a flash separator, and a distillation column through which the fluid feed stream flows, the hydrocarbon removal bed containing a solid adsorbent material that adsorbs the hydrocarbons in the feed stream, the flash separator being followed by the distillation column.

2. A system according to claim 1 wherein the fluid feed stream has been used in a gas process treatment and is chosen from the group consisting of glycol dehydration, amine sweetening, and MEG reclamation.

3. A system according to claim 1 wherein a regeneration fluid is used to regenerate the solid adsorbent material without removing it from the hydrocarbon removal bed, wherein the regeneration fluid is chosen from the group consisting of steam, water, and hot MEG.

4. A system according to claim 3 wherein the water is produced as the gas process fluid feed stream is treated in the distillation column.

5. A system according to claim 3 wherein the regeneration fluid is routed to a final production separator after it flows through the hydrocarbon removal bed.

6. A system according to claim 3 wherein the steam has a pressure ranging from 100 to 200 pounds per square inch (psi).

7. A process for removing hydrocarbons from a fluid feed stream, the process comprising the steps of:
providing a hydrocarbon removal bed containing a solid adsorbent material; and
passing the fluid feed stream through the hydrocarbon removal bed where the hydrocarbons are adsorbed by the solid adsorbent material;
passing the fluid feed stream through a flash separator followed by a distillation column.

8. A process according to claim 7 wherein the fluid feed stream has been used in a gas process treatment and is chosen from the group consisting of glycol dehydration, amine sweetening, and MEG reclamation.

9. A process according to claim 7 further comprising the step wherein a regeneration fluid is used to regenerate the solid adsorbent material without removing it from the hydrocarbon removal bed.

10. A process according to claim 9 wherein the regeneration fluid is water that is produced as the fluid feed stream is treated in the distillation column.

11. A process according to claim 9 wherein the regeneration fluid is routed to a final production separator after it flows through the hydrocarbon removal bed.

* * * * *